(12) United States Patent
Hilmann et al.

(10) Patent No.: US 7,862,057 B2
(45) Date of Patent: Jan. 4, 2011

(54) WHEEL SUSPENSION OF A STEERABLE WHEEL

(75) Inventors: Joergen Hilmann, Leverkusen (DE); Mark Loeffelsender, Niederkassel (DE)

(73) Assignee: Ford Global Technologies, LLC, Dearborn, MI (US)

( * ) Notice: Subject to any disclaimer, the term of this patent is extended or adjusted under 35 U.S.C. 154(b) by 381 days.

(21) Appl. No.: 11/948,529

(22) Filed: Nov. 30, 2007

(65) Prior Publication Data

US 2008/0129005 A1    Jun. 5, 2008

(30) Foreign Application Priority Data

Nov. 30, 2006    (DE) .................. 10 2006 056 484

(51) Int. Cl.
*B62D 7/16* (2006.01)
(52) U.S. Cl. .............................. 280/93.511; 280/93.512
(58) Field of Classification Search .............. 280/93.51, 280/93.511, 93.512, 124.134
See application file for complete search history.

(56) References Cited

U.S. PATENT DOCUMENTS

| | | | | |
|---|---|---|---|---|
| 5,938,219 A * | 8/1999 | Hayami et al. | ........ | 280/124.135 |
| 6,616,156 B1 * | 9/2003 | Dudding et al. | ........ | 280/93.512 |
| 6,733,019 B2 * | 5/2004 | Diener et al. | ............ | 280/93.51 |
| 6,974,141 B2 * | 12/2005 | Kim | ...................... | 280/93.512 |
| 7,090,232 B2 * | 8/2006 | Kim | ...................... | 280/93.512 |
| 7,487,985 B1 * | 2/2009 | Mighell | ................ | 280/124.103 |
| 2005/0017472 A1 * | 1/2005 | Kondo et al. | ........... | 280/93.513 |

FOREIGN PATENT DOCUMENTS

EP    1426203    5/2006

* cited by examiner

*Primary Examiner*—Toan C To
(74) *Attorney, Agent, or Firm*—Fredrick V. Owens; Joseph E. Root

(57) ABSTRACT

The invention relates to a wheel suspension of a steerable wheel, which wheel suspension has at least one wheel carrier to which are connected at least one steering rod and at least one lower transverse link. The wheel carrier is designed in at least three parts with a first wheel carrier part, a second wheel carrier part and a third wheel carrier part, which wheel carrier parts can be connected to one another by means of connecting elements in such a way that the at least three wheel carrier parts are moveable relative to one another.

4 Claims, 2 Drawing Sheets

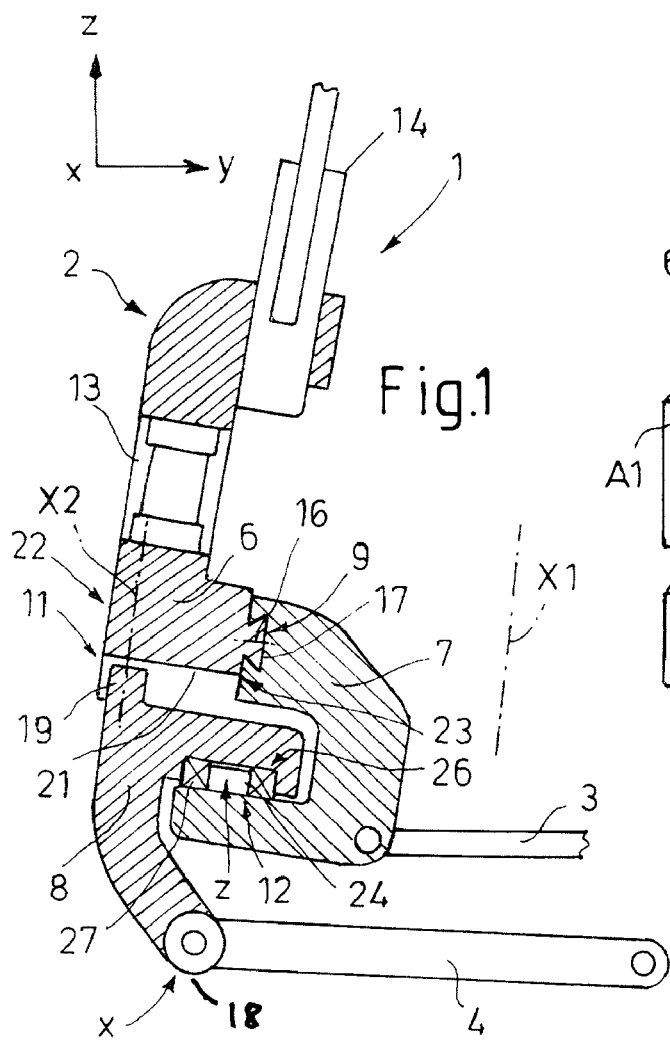
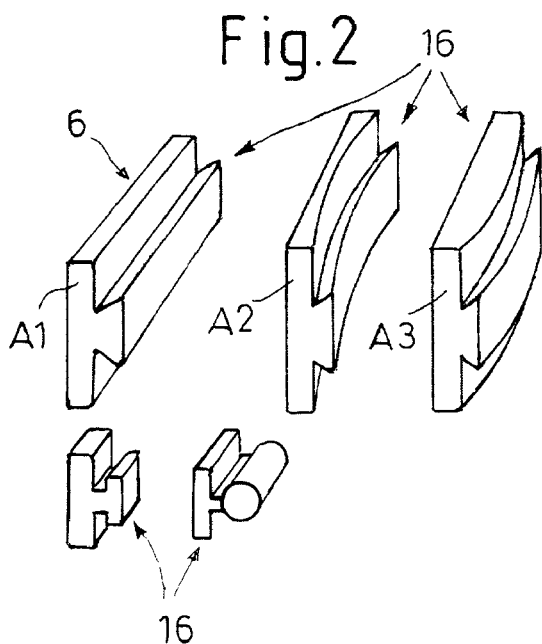
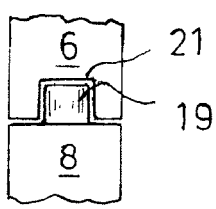
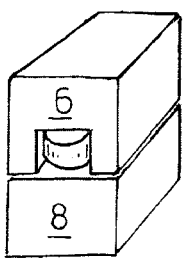
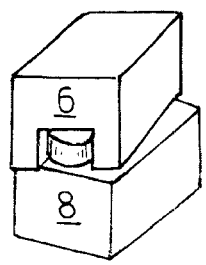

Stand der Technik

WHEEL SUSPENSION OF A STEERABLE WHEEL

FIELD OF INVENTION

The invention relates to a wheel suspension of a steerable wheel, which wheel suspension has at least one wheel carrier to which are connected at least one steering rod and at least one lower transverse link.

BACKGROUND OF INVENTION

Known motor vehicles of a certain size are often equipped with wheels of relatively large dimensions, which increase the driving comfort of the motor vehicle and offer a higher load capacity. At the same time, it is possible to observe a trend toward larger front-wheel-drive systems, usually in the form of transversely-installed internal combustion engines, wherein the motor vehicle body or structure should be as narrow as possible for aerodynamic reasons. This has the result that a space for the wheels is reduced in size, which conversely means that a maximum possible steering angle for example of front wheels is reduced.

A trend is also observed leading to motor vehicles with longer wheelbases combined with the transversely-installed internal combustion engine. This configuration enlarges the possible interior space of the motor vehicle and at the same time improves the driving comfort. A longer wheelbase, however, likewise reduces a possible steering radius.

In order to solve the above-stated problems, it is for example possible for all-wheel steering to be used. This, however, requires a steerable rear axle which loads the rear wheel suspension with additional weight and requires additional components for the rear wheel suspension. Such a system also requires some type of computer control, since the steering behavior of the rear wheels must be adapted both in terms of magnitude and direction as a function of the motor vehicle speed and other parameters.

EP 1 426 203 B1 discloses a method and a control element arrangement for adjusting the wheel track for a steerable vehicle arrangement. The arrangement has a steering adjustment member and a steering adjustment mechanism for transmitting steering movements from the steering adjustment member to a wheel hub and from the steering adjustment member to a wheel hub and a control arm, with the control arm being pivotably fastened at a first end to the vehicle and being provided with a ball joint. The ball joint is pivotably fastened to the wheel hub at a second end. An actuation of the steering adjustment mechanism causes a displacement of the ball joint by a predetermined path along an axis which runs substantially transversely with respect to a central longitudinal axis of the vehicle. The path is proportional to a vehicle wheel steering angle. The steering adjustment member acts on a controllable lever arm which is rotatable about a center of rotation on a wheel suspension control arm. The controllable lever arm acts on a pair of connecting rods which are pivotably fastened to the lever arm at opposite sides of the center of rotation on the lever arm, and to the wheel hub at opposite sides of the ball joint.

The method and the control member arrangement as per EP 1 426 203 B1 is advantageous in that a steering circle radius of the steer angle can be reduced by virtue of the centers of rotation of the wheels being moved away from disturbing components of the motor vehicle, so that larger steering angles can be obtained. In addition, the positional change of the wheels when the latter are steered results in a wider track for the steerable wheels, resulting in the handling of the motor vehicle when traveling around curves being improved. The subject matter of EP 1 426 203 B1 therefore has a positive effect both on the steer angle and also on the dynamic handling of the motor vehicle.

SUMMARY OF THE INVENTION

This invention is based on further improving a wheel suspension of a steerable wheel of the type specified in the introduction using simple means in such a way that a variable track width which is dependent on the steering angle, with simultaneously good turning properties of the motor vehicle, is obtained, wherein for the same turning circle, larger wheels can be used, or for the same wheels and turning circle, more space as viewed in the transverse direction of the motor vehicle should be gained for the engine bay or for the longitudinal members.

According to the invention, the object is achieved in that the wheel carrier is designed in at least three parts with a first wheel carrier part, a second wheel carrier part and a third wheel carrier part, which wheel carrier parts are connected to one another by means of connecting elements in such a way that the at least three wheel carrier parts are moveable relative to one another.

As a result of the advantageous division of the wheel carrier into at least three wheel carrier parts, the angle of the steerable wheel for a given track width can be enlarged for all wheel dimensions, by virtue of the wheel central point being moved outward with respect to a central longitudinal axis of the motor vehicle. This is advantageously obtained by means of rotationally and/or translatorily acting connecting elements. In this way, a variable track width is obtained which is controlled by means of the steering angle. The greater the steering angle, the further the wheel central point moves, with the steerable wheel preferably being connected to the first wheel carrier part, preferably outward with respect to the longitudinal central axis, with the following formula forming the basis:

$$dy = \sin(\alpha) * dy0.$$

At larger steering angles, it is therefore advantageously possible to dispense with for example a large cutout in a longitudinal member of the motor vehicle which is required in the wheel suspensions known in the prior art. On account of the cutout required in the prior art in the longitudinal member of the motor vehicle, the stability of said longitudinal member is severely restricted, and said longitudinal member must possibly even be reinforced in order to obtain the required stability properties.

In one advantageous embodiment of the wheel suspension, in particular on account of the expedient division of the wheel carrier into its at least three wheel carrier parts, it is possible to advantageously dispense with such a cutout in the longitudinal member, so that the latter need no longer be reinforced in order to obtain the required operational strength, and so that the longitudinal member is easier to produce overall. This brings about not only an advantage for the safety of the motor vehicle but at the same time reduces the motor vehicle weight, which has an advantageous effect on a possible loading of the motor vehicle and the motor vehicle fuel consumption.

It is preferred within the context of the invention, if the first wheel carrier part is connected to the second wheel carrier part by means of a translatorily acting connecting element, which connecting element is connected to the at least one steering rod by means of a ball joint. Said connecting element can be of planar or curved design.

It is also preferable within the context of the invention if the first wheel carrier part is connected to the third wheel carrier part by means of a translatorily and at the same time rotationally acting connecting element, which connecting element is connected to the lower transverse link by means of a rotationally acting connecting element. As a result of this advantageous embodiment, it is possible to dispense with a ball joint known from the prior art for connecting the transverse link to the wheel carrier.

Another advantage of the invention is if the third wheel carrier part is connected to the second wheel carrier part by means of a rotationally acting connecting element.

The connecting element between the first wheel carrier part and the second wheel carrier part is expediently designed as a sliding joint, with the sliding joint being formed in one preferred embodiment from a projection which is arranged on the first wheel carrier part and which engages into a recess, which corresponds to the projection, in the second wheel carrier part, so that the first wheel carrier part is moveable relative to the second wheel carrier part. The projection can of course also be arranged on the second wheel carrier part, wherein the recess could then be correspondingly arranged in the first wheel carrier part.

It is preferable within the context of the invention if the connecting element between the first wheel carrier part and the third wheel carrier part is designed as a pin which is arranged on the third wheel carrier part, with the pin engaging into a groove which is arranged in the first wheel carrier part and extends vertically with respect to a steering axis and with respect to a steering direction from an outer side of the first wheel carrier part in the direction of its inner side and of the second wheel carrier part, so that the third wheel carrier part is rotatable relative to the first wheel carrier part about a steering axis and the first wheel carrier part is moveable relative to the third wheel carrier part. It can of course also be provided that the groove is arranged in the third wheel carrier part, wherein the pin could be assigned to the first wheel carrier part. The pin can in each case be formed in one piece with the respective wheel carrier part, with it of course also being possible for said pin and wheel carrier part to be produced separately and subsequently connected in a suitable manner.

The connecting element between the second wheel carrier part and the third wheel carrier part is advantageously designed as a revolute joint or rotary joint, so that the second wheel carrier part and the third wheel carrier part are connected so as to be rotatable relative to one another about a steering axis. The revolute joint is advantageously formed from a bolt which is arranged on the third wheel carrier part and which engages into an opening arranged in the second wheel carrier part, in which opening is arranged at least one bearing element, so that the bolt is encompassed by the at least one bearing element. The bearing element can for example be designed as a ball bearing which bears with its inner periphery against the bolt and which bears with its outer periphery against an inner periphery of the opening.

The bolt can of course also be arranged on the second wheel carrier part, wherein the opening could of course then be arranged on the third wheel carrier part.

Overall, the three wheel carrier parts are connected by means of a combination of translatorily and/or rotationally acting connecting elements. The respective connection is of course matched to the required stability demands, with suitable lubricating provisions of course being provided for the connecting elements.

BRIEF DESCRIPTION OF THE DRAWINGS

Further advantageous embodiments of the invention are disclosed in the subclaims and in the following description of the figures, in which:

FIG. 1 shows a wheel carrier in a diagrammatic sketch,

FIG. 2 shows a first wheel carrier part with a detail of the connecting region to the second wheel carrier part in different embodiments as a diagrammatic sketch, FIG. 3 shows a diagrammatic sketch of a connecting element between the first wheel carrier part and the third wheel carrier part.

In the various figures, the same parts are always provided with the same reference symbols, so that said parts are generally also described only once.

DETAILED DESCRIPTION OF THE PREFERRED EMBODIMENTS

Figure 4:
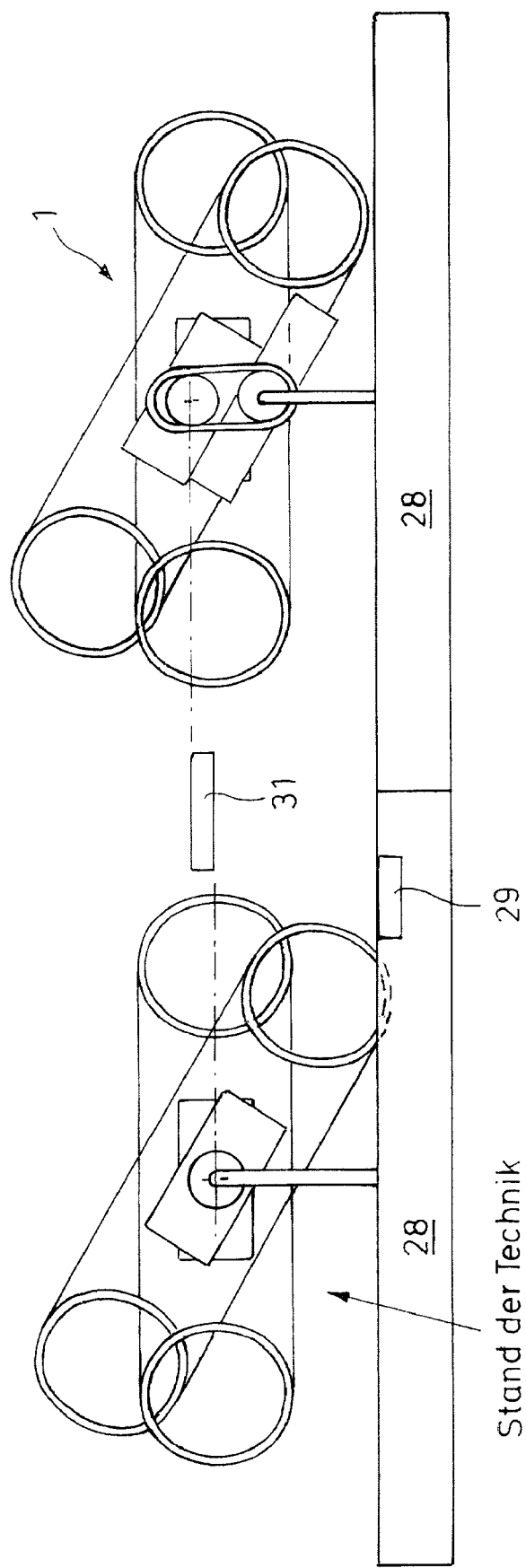
FIG. 4 shows a comparison of the prior art with the wheel carrier according to the invention.

FIG. 1 shows a wheel suspension 1 of a steerable wheel, which wheel suspension has at least one wheel carrier 2 to which are connected at least one steering rod 3 and at least one lower transverse link 4. In the illustrated exemplary embodiment, the wheel carrier 2 is designed in three parts with a first wheel carrier part 6, a second wheel carrier part 7 and a third wheel carrier part 8. The three wheel carrier parts 6, 7, 8 are connected to one another by means of connecting elements 9, 11, 12 in such a way that the at least three wheel carrier parts 6, 7, 8 are moveable relative to one another.

The first wheel carrier part 6 has a bearing arrangement 13 for the steerable wheel (not illustrated), with the first wheel carrier part 6 additionally being connected to a damper 14.

The first wheel carrier part 6 is connected to the second wheel carrier part 7 by means of a translatorily acting connecting element 9, which connecting element 9 is connected to the at least one steering rod 3 by means of a ball joint (not illustrated). The translatorily acting connecting element 9 between the first wheel carrier 6 and the second wheel carrier 7 is designed in the illustrated exemplary embodiment as a sliding joint. The sliding joint is formed from a projection 16 which is arranged on the first wheel carrier part 6 and which engages into a recess 17, which corresponds to the projection 16, arranged in the second wheel carrier part 7, so that the first wheel carrier part 6 is moveable relative to the second wheel carrier part 7 when the at least one steering rod 3 transmits a steering movement to the second wheel carrier part 7.

FIG. 2 illustrates different embodiments and designs of the projection 16.

In a first preferred embodiment, the projection 16 is designed in the shape of a dovetail, as shown in the exemplary embodiments illustrated at the top in the drawing.

In the exemplary embodiment illustrated with the reference symbol A1 in FIG. 2, the dovetail-shaped projection 16 is of substantially linear (planar) design, wherein in the exemplary embodiment with the reference symbol A2, a concave (curved) configuration of the dovetail-shaped projection 16 is illustrated. In the exemplary embodiment with the reference symbol A3, the dovetail-shaped projection 16 is illustrated in a convex (curved) configuration. In the various embodiments of the dovetail-shaped projections 16, for the individual examples A1, A2 and A3, the corresponding contact face of the first wheel carrier part 6 to the second wheel carrier part 7 is of course of corresponding design to the configuration of the dovetail-shaped projections 16.

In a further embodiment of the projections 16, a T-shaped projection 16 is illustrated at the bottom left of the drawing in FIG. 2, with a round cylindrical projection 16, which is connected by means of a connecting web to the first wheel carrier part 6, being illustrated at the bottom right.

The projections 16 in their various embodiments illustrated in each case, can of course be produced in one piece with the first wheel carrier part 6, with it of course also being conceivable for the projections 16 to be produced separately, and it being possible for said projections to be connected to the first wheel carrier part 6 by means of suitable types of connection. On account of the translatorily acting connecting element 9 or sliding joint, the first wheel carrier part 6 is positively pushed, and driven corresponding to the steer angle, in the event of a steering force being exerted by the steering rod 3 on the second wheel carrier part 7.

The first wheel carrier part 6 is additionally connected to the third wheel carrier part 8 by means of a translatorily and at the same time rotationally acting connecting element 11, which connecting element 11 is connected to the lower transverse link 4 by means of a rotationally acting connecting element 18. The connecting element 18 causes a rotation in the x-direction.

The translatorily and at the same time rotationally acting connecting element 11 between the first wheel carrier part 6 and the third wheel carrier part 8 is designed as a pin 19 which is arranged on the third wheel carrier part 8. The pin 19 can be produced in one part with the third wheel carrier part 8 or, as a separate component, can be connected thereto in a suitable manner.

The pin 19 engages into a groove 21 which is arranged in the first wheel carrier part 6. The groove 21 extends vertically with respect to a steering axis X1 and with respect to a steering direction from an outer side 22 of the first wheel carrier part 6 in the direction of its inner side 23, which is situated opposite said outer side 22, and in the direction of the second wheel carrier part 7. The groove 21 is closed off toward the outer side 22 and is open toward the inner side 23. The third wheel carrier part 8 is therefore rotatable relative to the first wheel carrier part 6 about a steering axis X2 which runs through the pin 19, with the first wheel carrier part 6 at the same time being moveable in the translatory direction relative to the third wheel carrier part 8. The translatorily and rotationally acting connecting element 11 is therefore a combined rotary-sliding joint.

The third wheel carrier part 8 is connected to the second wheel carrier part 7 by means of a rotationally acting connecting element 12.

The rotationally acting connecting element 12 between the second wheel carrier part 7 and the third wheel carrier part 8 is designed as a revolute joint, so that the second wheel carrier part 7 and the third wheel carrier part 8 are connected so as to be rotatable relative to one another about a first steering axis X1. The rotationally acting connecting element 12 causes a rotation in the z-direction.

The two steering axes X1 and X2 are illustrated in dashed lines in FIG. 1, with the second steering axis X2 running through the pin 19 of the translatorily and rotationally acting connecting element 11 between the first wheel carrier part 6 and the third wheel carrier part 8. The first steering axis X1 runs collinearly with respect to the second steering axis X2, and is offset relative to the second steering axis X2 inward, that is to say in the direction of a longitudinal axis (not illustrated) of the motor vehicle.

The revolute joint or the rotationally acting connecting element 12 between the second wheel carrier part 7 and the third wheel carrier part 8 is formed from a bolt 24 which is arranged on the third wheel carrier part 8 and which engages into an opening 26 arranged in the second wheel carrier part 7. Arranged in said opening 26 is a bearing element 27, so that the bolt 24 is encompassed by the at least one bearing element 27. The revolute joint is therefore virtually designed as a rotary joint.

The bearing element 27 is, in one preferred embodiment, designed as a ball bearing which engages with its inner periphery around the bolt 24 and which bears with its outer periphery against an inner side of the opening 26 preferably without play.

As already described above, the transverse link 4 is connected to the third wheel carrier part 8 by means of a rotationally acting connecting element 18. In this way, it is advantageously possible to dispense with a ball joint usually used in the prior art for connecting the transverse link 4 to the wheel carrier 2.

The translatorily and/or rotationally acting connecting elements 9, 11, 12 now have the effect that, when a steering movement is transmitted via the steering rod 3 to the second wheel carrier part 7, the second and third wheel carrier parts 7 and 8 rotate relative to one another, with the first wheel carrier part 6 being displaced translatorily and driven in the direction of the steer angle as viewed in the rotational direction. Since the steerable wheel (not illustrated) is also connected to the first wheel carrier part 6, said steerable wheel, or the central point thereof, is not only rotated in the desired direction, but also displaced outward with respect to a central longitudinal axis of the motor vehicle, in the event of a steering movement.

This effect is illustrated by way of example in FIG. 4, with the left-hand drawing in FIG. 4 illustrating a wheel suspension according to the prior art, and with the right-hand drawing of FIG. 4 illustrating a wheel suspension according to the invention.

As can be seen from the wheel suspension according to the prior art, a longitudinal member of the motor vehicle must have a cutout (box 29) in order to be able to carry out the possible steering angles or steer angles. With a wheel suspension 1 according to the invention, it is possible to dispense with such a cutout in the region of the longitudinal member 28, since the steerable wheel or its central point are displaced outward during a steering movement.

FIG. 4 illustrates by way of example a steering angle of 30°, wherein according to the invention, the wheel central point is correspondingly displaced further outward at large steering angles or at increasing steering angles. This is illustrated in FIG. 4 by means of the box 31.

We claim:

1. A wheel carrier of a steerable wheel suspension, the wheel carrier connected to at least one steering rod and at least one lower transverse link, comprising: a first wheel carrier part, a second wheel carrier part, and a third wheel carrier part, wherein at least three connecting elements connect the wheel carrier parts to one another; and the three wheel carrier parts are moveable relative to one another; and the connecting element between the first wheel carrier part and the second wheel carrier part is a sliding joint.

2. The wheel carrier as claimed in claim 1, the sliding joint further comprising a projection arranged on the first wheel carrier part and a recess in the second wheel carrier part, wherein the projection engages into the recess such that the first wheel carrier part is moveable relative to the second wheel carrier part.

3. A wheel carrier of a steerable wheel suspension the wheel carrier connected to at least one steering rod and at least one lower transverse link, comprising; a first wheel carrier part, a second wheel carrier part, and a third wheel carrier part, wherein at least three connecting elements connect the wheel carrier parts to one another; and the three wheel carrier parts are moveable relative to one another; and the connecting element between the first wheel carrier part and the third wheel carrier part comprises a pin which is arranged on the third wheel carrier part, and a groove arranged in the first wheel carrier part wherein the pin engages into the groove so that the third wheel carrier part is rotatable relative to the first wheel carrier part and the first wheel carrier part is moveable relative to the third wheel carrier part.

4. A wheel carrier of a steerable wheel suspension the wheel carrier connected to at least one steering rod and at least one lower transverse link, comprising: a first wheel carrier part, a second wheel carrier part, and a third wheel carrier part, wherein at least three connecting elements connect the wheel carrier parts to one another; and the three wheel carrier parts are moveable relative to one another; and the connecting element between the second wheel carrier part and the third wheel carrier part is a revolute joint so that the second wheel carrier part and the third wheel carrier part are connected so as to be rotatable relative to one another, the revolute joint further comprising a bolt arranged on the third wheel carrier part and an opening having at least one bearing element is arranged in the second wheel carrier part wherein the bolt engages into the opening such that it is encompassed by the at least one bearing element.

* * * * *